Feb. 11, 1964 L. E. DONELAN 3,120,943
IMPULSE SOLENOID ACTUATED PIVOTED VALVE
Filed Sept. 5, 1962

Inventor
Lynn E. Donelan
By W. S. Robertson
Attorney

United States Patent Office 3,120,943
Patented Feb. 11, 1964

3,120,943
IMPULSE SOLENOID ACTUATED PIVOTED VALVE
Lynn E. Donelan, West Allis, Wis., assignor to Allis-Chalmers Manufacturing Company, Milwaukee, Wis.
Filed Sept. 5, 1962, Ser. No. 221,578
4 Claims. (Cl. 251—139)

This application relates to an operating mechanism for a valve or similar device that is moved between two positions. More specifically this invention relates to a valve that is opened and closed by a current operated solenoid and is latched in either position by permanent magnets.

One object of this invention is to provide a new and improved operating mechanism for a two position valve.

Another object of this invention is to provide a new and improved valve that is opened and closed electrically and is latched into position by a permanent magnet that does not require power.

Another object of this invention is to provide a new and improved valve that is operated by means of a solenoid outside the valve body.

In the valve of this invention the valve disk includes a permanent magnet that is magnetically oriented with its poles at two opposite edges of the valve disk. The valve disk is located inside a magnetic solenoid structure, and nonpermanent magnets are located in the valve body to contact the valve disk near the poles of the permanent magnet in either position. When the solenoid is not energized, the permanent magnet holds the disk in one of the two positions that the nonpermanent magnets establish. Energizing the solenoid in the proper polarity establishes a magnetic field in the nonpermanent magnets that moves the valve disk to its other position.

The detailed description of the invention and the drawing will suggest other objects and advantages of this invention.

In the drawing, FIG. 1 is a longitudinal cross section of one embodiment of the valve of this invention with the valve closed.

Figure 1:
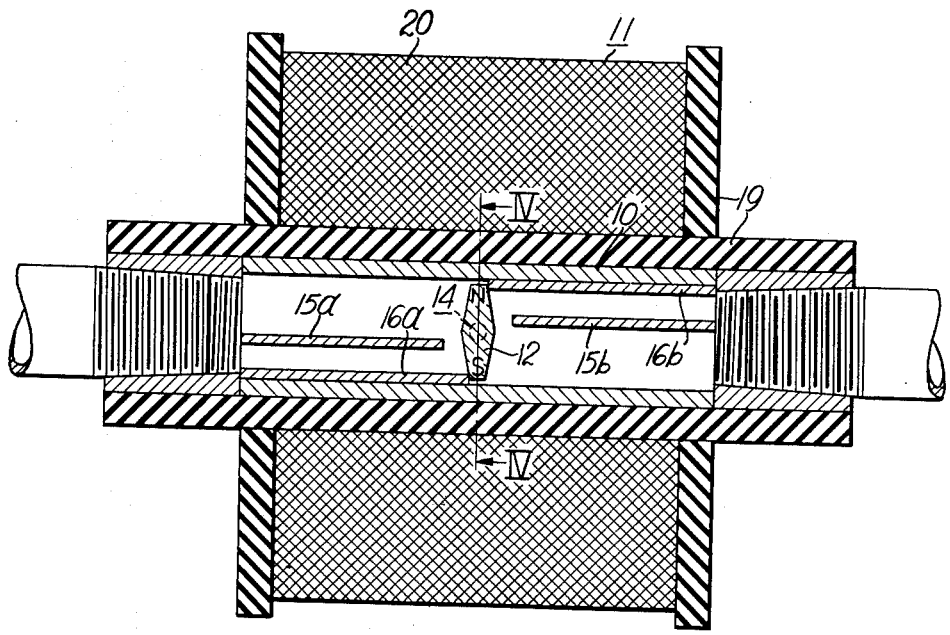

As FIG. 1 shows, the valve comprises a body 10, a solenoid 11 mounted on the valve body to have its magnetic axis approximately in line with the axis of the valve body, a valve disk 12, a valve disk shaft 14 that supports the valve disk inside the solenoid, and open holding elements 15a and 15b and closed holding elements 16a and 16b positioned to engage valve disk 12 in either its open or closed position.

Figure 4:
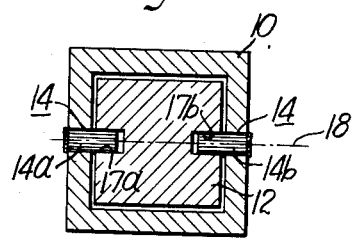
FIG. 4 is a cross section along lines IV—IV of FIG. 1.

The valve body 10 is of any suitable nonmagnetic material such as stainless steel (that is, its relative permeability is approximately one) and has an internal bore that is shaped to receive valve disk 12 in a sealing relationship when the valve is closed. As FIG. 4 shows, the bore is rectangular and valve disk 12 is also rectangular and is slightly smaller than the bore of the body to provide clearance for freely pivoting valve disk 12 open and closed. The valve shaft 14, which pivotally supports valve disk 12 in body 10, may comprise two sections 14a, 14b that are suitably secured to opposite inside walls of valve body 10 and fit freely into cylindrical recesses 17a, 17b along the axis 18 of valve disk 12.

Solenoid 11 has a suitable coil form 19 of insulating material and sufficient turns 20 of an insulated conductor to operate the valves satisfactorily when the coil is energized.

Valve disk 12 is preferably made entirely of a material having a high coercivity and residual magnetism (i.e. valve disk 12 is a permanent magnet). The direction of magnetism of the valve disk 12 (or at least a significant component) is from edge to edge of valve disk 12 and at substantially right angles to the axis of shaft 14.

Elements 15a, 15b, 16a and 16b may be of any suitable magnetic material with low coercivity (i.e. they are nonpermanent magnets), such as soft iron bars, or stacks of thin insulated laminations. Elements 15a, 15b, 16a, 16b and the permanent magnet of valve disk 12 may be provided with any desirable nonmagnetic coating as the magnet of valve disk 12 does not have to contact the magnetic elements 15a, 15b, 16a, 16b.

Figure 3:
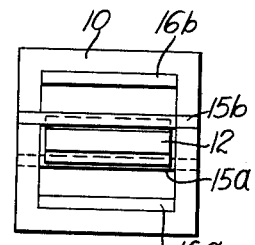
FIG. 3 is an end view of the valve of FIG. 2.

The magnetic elements 15a, 15b, 16a, 16b may be of any suitable shape. Preferably as FIG. 3 shows, closed holding elements 16 are shaped to conform to the side walls of the valve body 10, and are positioned to engage valve disk 12 near the poles of the permanent magnet. Elements 15a, 15b, 16a and 16b are made as long as practical (and may be in effect continued by a yoke around the outside of the solenoid 11 and outside body 10) in order to increase the magnetic potential in the region of the valve disk 12 in relation to the side of the coil and the permanent magnet. Preferably as FIG. 3 shows, elements 16a and 16b are at least as wide as the poles of the magnet 12 and cooperate with the edges of valve disk 12 to form a seal.

Elements 15a and 15b are positioned near the axis of valve body 10 in order to open valve disk 12 as fully as possible. Elements 15a and 15b extend sufficiently toward valve disk 12 to form stops for the valve disk.

Operation

Figure 2:
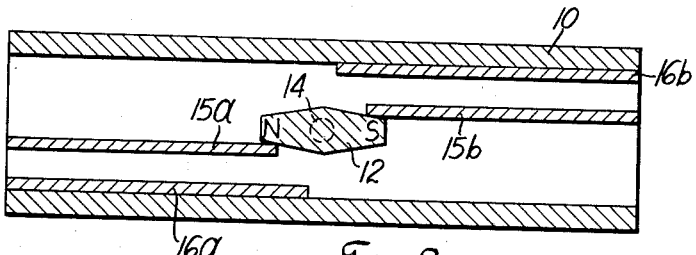
FIG. 2 is an enlarged view similar to FIG. 1 with parts removed showing the valve open.

Except for the permanent magnet of valve disk 12 and the nonpermanent magnets 15a, 15b, 16a, 16b, solenoid 11 would produce a well known magnetic pattern in which lines of flux run through the bore of the valve body, flare out of either end of the valve, and close in the space outside the solenoid. Nonpermanent magnets 15a, 15b, 16a, 16b significantly concentrate the flux in the bore of the valve. As FIGS. 1 and 2 show, the permanent magnet of valve disk 12 bridges the space of high flux density between the elements 15a, 16a at one end of the valve and the corresponding elements 15b, 16b at the other end of the valve.

The operation of the valve can be explained by considering only one pole of the permanent magnet and one open holding element 15a and a single corresponding closed holding element 16b. In the position of the valve that FIG. 1 shows, the north pole of the valve disk 12 is near the closed holding elements 16b and the magnetic attraction of the permanent magnet and the iron of element 16b holds the valve closed even when coil 20 is de-energized. Valve disk 12 would reclose if it were joggled slightly off its seat. When coil 20 is energized in the polarity to produce a north pole at the right hand end of the solenoid of FIG. 1, the magnetic flux in element 16b associated with the coil current causes elements 16b and the north pole of valve disk 12 to attract. When coil 20 is energized in the opposite polarity so that the left hand end of the solenoid (FIG. 1) becomes a north pole, the end of element 16b contacting the north pole of valve disk 12 becomes a north pole and the magnetic field of the permanent magnet and solenoid tend to rotate valve disk 12 counterclockwise to open the valve. At the same time, the end of open holding element 15a nearest valve disk 12 becomes a south pole and tends to attract the north pole end of valve disk 12. In this example, when coil 20 is properly energized, elements 15a, 15b and 16a, 16b cooperate with the permanent magnet to rotate valve disk 12 counterclockwise to its open position. Energizing coil 20 in the opposite polarity when the valve is open produces the opposite magnetic relation between the permanent magnet and elements 15a, 15b, 16a, 16b and closes the valve.

When coil 20 is deenergized while the valve disk 12 is in a mid position, the permanent magnet of valve disk 12 tends to pull the valve to the nearest position. The permanent magnet may be made large enough to assure that the valve disk will stop only in either a closed or an open position, or the permanent magnet can be made only strong enough to move valve disk 12 in cooperation with coil 20 or when the valve disk 12 is very near one of its two positions.

Those skilled in the art will recognize various modifications of this embodiment of the invention within the scope of the claims.

Having now particularly described and ascertained the nature of my said invention and the manner in which it is to be performed, I declare that what I claim is:

1. A valve comprising
a valve body of nonmagnetic material,
a valve disk pivotally mounted inside said body,
a solenoid mounted on said body and energizable in two polarities to tend to align said valve disk with the magnetic field of said solenoid in two positions according to the polarity of said solenoid, and
means in said valve body defining stops for said valve disk to establish an open position and a closed position for said valve.

2. a valve comprising
a valve body of nonmagnetic material,
a valve disk including a permant magnet pivotably mounted inside said body to move from an open position with a pole of said permanent magnet near the longitudinal line of said mounting means and a closed position with said pole near a side wall of said body,
a first nonpermanent magnet element positioned near said longitudinal line of said body to engage said pole when said valve is open,
a second nonpermanent magnet element positioned near said side wall of said body to engage said pole when said valve is closed, and
a solenoid operable to open said valve when energized in one polarity and to close said valve when energized in the opposite polarity.

3. A valve comprising
a valve body,
a valve disk pivotally mounted inside said body, said valve disk having a permanent magnet magnetically aligned at substantially right angles to its pivotal axis,
a solenoid mounted on said valve body and energizable in opposite polarities to tend to align the magnetic axis of said permanent magnet with the axis of said solenoid, and
nonpermanent magnetic elements positioned in said valve body to form stops establishing an open position and a closed position for said valve disk.

4. A valve comprising
a valve body of nonmagnetic material,
a solenoid mounted on said valve body and energizable to produce a magnetic field in said valve body having a selectable polarity,
a valve disk,
means positioning said valve disk in said body to pivot between an open position and said closed position,
said valve disk including a magnet permanently magnetized to establish the direction of motion of said valve disk corresponding to the polarity of said field,
means in said valve body extending in the direction of the magnetic field established by said solenoid and positioned to define stops limiting the motion of said valve between open and closed positions, and
said stops being of magnetic material to cooperate with said solenoid in moving said valve disk and to cooperate with the permanent magnet to latch said valve in position.

References Cited in the file of this patent
UNITED STATES PATENTS
1,820,272    Gumpper  ---------------  Aug. 25, 1931
FOREIGN PATENTS
398,331    France  ------------------  Mar. 20, 1909